United States Patent
Deshpande et al.

(10) Patent No.: US 10,210,251 B2
(45) Date of Patent: Feb. 19, 2019

(54) SYSTEM AND METHOD FOR CREATING LABELS FOR CLUSTERS

(71) Applicant: Tata Consultancy Services Limited, Maharashtra (IN)

(72) Inventors: Shailesh Shankar Deshpande, Maharashtra (IN); Girish Keshav Palshikar, Maharashtra (IN); Athiappan G, Maharashtra (IN)

(73) Assignee: TATA CONSULTANCY SERVICES LIMITED (IN)

( * ) Notice: Subject to any disclaimer, the term of this patent is extended or adjusted under 35 U.S.C. 154(b) by 488 days.

(21) Appl. No.: 14/188,979

(22) Filed: Feb. 25, 2014

(65) Prior Publication Data
US 2015/0006531 A1   Jan. 1, 2015

(30) Foreign Application Priority Data
Jul. 1, 2013   (IN) .......................... 2217/MUM/2013

(51) Int. Cl.
*G06F 17/30*   (2006.01)
(52) U.S. Cl.
CPC .............. *G06F 17/30784* (2013.01)
(58) Field of Classification Search
CPC ............................................... G06F 17/30784
USPC ....................................................... 707/737
See application file for complete search history.

(56) References Cited

U.S. PATENT DOCUMENTS

| | | | | |
|---|---|---|---|---|
| 5,526,443 A | * | 6/1996 | Nakayama | ........ G06F 17/30616 382/173 |
| 5,745,602 A | * | 4/1998 | Chen | ................ G06F 17/30616 382/177 |
| 7,313,556 B2 | | 12/2007 | Gallivan et al. | |
| 7,325,006 B2 | * | 1/2008 | Fortnan | ............. G06F 17/30705 |
| 7,478,081 B2 | * | 1/2009 | Hacigumus | ....... G06F 17/30619 |

(Continued)

FOREIGN PATENT DOCUMENTS

EP   1589443 A2   10/2005

OTHER PUBLICATIONS

Stephen Huffman, Department of Defense, Ft. George G. Meade, MD 20755-6000, "Acquaintance: Language-Independent Document Categorization by N-Grams" Nov. 1995.

*Primary Examiner* — Miranda Le
(74) *Attorney, Agent, or Firm* — Hayes Soloway P.C.

(57) ABSTRACT

Disclosed is a method and system for creating labels for cluster in computing environment. The system comprises receiving module, candidate items selector, combination array generator, coverage value analyzer, candidate pair selector, unique word filter and cluster label selector. Receiving module receives input data and candidate items selector selects candidate items occurring repetitively using n-gram technique to generate list of candidate items with frequency of occurrence. Combination array generator selects candidate items to populate two-dimensional array wherein each array element represents pair of n-gram. Coverage value analyzer determines coverage value for each pair of n-gram from array. Candidate pair selector selects pairs of n-gram from two-dimensional array to process and generate list of candidate pairs. The unique word filter determines number of unique words in each candidate pair. Cluster label selector sorts list of candidate pairs using coverage value and number of unique words to select cluster label.

13 Claims, 3 Drawing Sheets

(56) References Cited

U.S. PATENT DOCUMENTS

| | | | |
|---|---|---|---|
| 7,580,921 B2 * | 8/2009 | Patterson | G06F 17/30616 |
| 7,593,921 B2 * | 9/2009 | Goronzy | G06F 17/30035 |
| 7,644,047 B2 * | 1/2010 | Assadian | G06F 17/2795 |
| | | | 704/9 |
| 7,644,076 B1 * | 1/2010 | Ramesh | G06F 17/3071 |
| | | | 707/999.006 |
| 7,739,103 B2 * | 6/2010 | Deane | G06F 17/277 |
| | | | 704/1 |
| 7,840,400 B2 * | 11/2010 | Lavi | G06F 17/2785 |
| | | | 704/9 |
| 8,001,128 B2 * | 8/2011 | Hacigumus | G06F 17/30619 |
| | | | 707/741 |
| 8,005,782 B2 * | 8/2011 | Reznik | G06F 17/30707 |
| | | | 706/52 |
| 8,010,534 B2 * | 8/2011 | Roitblat | G06F 17/30705 |
| | | | 707/742 |
| 8,078,452 B2 * | 12/2011 | Deane | G06F 17/2775 |
| | | | 704/1 |
| 8,108,204 B2 * | 1/2012 | Gabrilovich | G06F 17/30616 |
| | | | 704/275 |
| 8,171,029 B2 * | 5/2012 | Marvit | G06F 17/2735 |
| | | | 704/1 |
| 8,175,864 B1 * | 5/2012 | Dubiner | G06F 17/2818 |
| | | | 704/2 |
| 8,175,878 B1 * | 5/2012 | Chelba | G06F 17/2715 |
| | | | 704/240 |
| 8,280,877 B2 * | 10/2012 | Zhang | G06F 17/278 |
| | | | 707/723 |
| 8,332,207 B2 * | 12/2012 | Brants | G06F 17/2818 |
| | | | 370/270 |
| 8,447,589 B2 * | 5/2013 | Ishikawa | G06F 17/2795 |
| | | | 704/9 |
| 8,554,696 B2 * | 10/2013 | Stergiou | G06F 17/30631 |
| | | | 706/12 |
| 8,631,007 B1 * | 1/2014 | Blandford | G06Q 30/0241 |
| | | | 707/736 |
| 8,719,236 B2 * | 5/2014 | Zinar | G06F 17/30303 |
| | | | 707/664 |
| 8,738,552 B2 * | 5/2014 | Ellingsworth | G06F 17/30707 |
| | | | 706/20 |
| 8,781,817 B2 * | 7/2014 | Thomas | G06F 17/27 |
| | | | 704/1 |
| 8,798,984 B2 * | 8/2014 | Cancedda | G06F 17/2818 |
| | | | 704/2 |
| 8,812,300 B2 * | 8/2014 | Gillam | G06F 17/30985 |
| | | | 704/10 |
| 9,117,006 B2 * | 8/2015 | Zhu | G06F 17/30861 |
| 9,208,145 B2 * | 12/2015 | Krovetz | G06F 17/2775 |
| 9,239,827 B2 * | 1/2016 | Zhang | G06F 17/277 |
| 9,349,184 B2 * | 5/2016 | Hirst Dowson | G06K 9/3233 |
| 2003/0233232 A1 * | 12/2003 | Fosler-Lussier | G10L 15/1815 |
| | | | 704/251 |
| 2007/0043755 A1 * | 2/2007 | Rolleke | G06F 17/30595 |
| 2009/0024555 A1 * | 1/2009 | Rieck | G06F 7/02 |
| | | | 706/54 |
| 2009/0043797 A1 * | 2/2009 | Dorie | G06F 17/3071 |
| 2009/0204609 A1 * | 8/2009 | Labrou | G06F 17/3064 |
| 2010/0042576 A1 * | 2/2010 | Roettger | G06F 17/2211 |
| | | | 706/55 |
| 2010/0185685 A1 * | 7/2010 | Chew | G06F 17/2827 |
| | | | 707/803 |
| 2011/0040769 A1 * | 2/2011 | Tseng | G06F 17/30864 |
| | | | 707/750 |
| 2012/0246176 A1 | 9/2012 | Takamatsu et al. | |
| 2012/0319874 A1 * | 12/2012 | Jang | H04L 1/0041 |
| | | | 341/52 |
| 2013/0212475 A1 * | 8/2013 | Lee | G06F 17/276 |
| | | | 715/261 |
| 2014/0115527 A1 * | 4/2014 | Pepper | G06F 17/30 |
| | | | 715/781 |
| 2014/0229408 A1 * | 8/2014 | Vijayaraghavan | G06N 99/005 |
| | | | 706/12 |
| 2014/0258185 A1 * | 9/2014 | Sharon | G06N 99/005 |
| | | | 706/12 |
| 2014/0297261 A1 * | 10/2014 | Sayers | G06F 17/2765 |
| | | | 704/9 |

* cited by examiner

SYSTEM AND METHOD FOR CREATING LABELS FOR CLUSTERS

TECHNICAL FIELD

The present subject matter described herein, in general, relates to text mining and text clustering, more particularly to creating one or more labels for one or more clusters.

BACKGROUND

In current business scenario, organizing and analyzing huge amount of electronics records is a challenging task. In order to achieve the business objectives of the organization, categorizing the electronic records in different groups based on records similarity is a common step deployed. When user doesn't know about the number of groups to be formed and the nature of the groups, usually unsupervised approach such as clustering is applied. In clustering, system form groups by automatically comparing each document with other documents and by using a threshold for forming a group. Few documents from the collection are selected as the cluster centers around which the groups are formed. Clustering textual answers to a survey questionnaire is one of the significant mechanisms to generate meaningful insights from textual responses.

Most of the clustering techniques do not provide descriptive labels to the clusters. In order to identify good descriptive label for a set of documents, user has to go through the set of documents manually, read and understand them, and then a descriptive label may be created.

Automatic cluster labeling disclosed in prior art faces many challenges such as single word or words set as label, are not sufficient descriptors and they fail to provide descriptive label. A complete sentence as a label is too lengthy for many situations. A complete sentence or words and/or phrases as in centroid vector are also not very useful as it is too lengthy and might not provide good coverage. Most frequent single word and/or phrase also fail to provide good coverage. Complex semantic analysis does not help as it is more time consuming than clustering.

There are many solutions provided in the prior art for cluster labeling, one of them discloses extracting verb phrases, noun phrases from a given cluster using natural language parser. Further, the method calculates the Kullback-Leibler divergence for each keyword or combination of keywords as extracted. Most discriminative key words for a given cluster are selected as the cluster labels. However these labels are not good enough as cluster label and the method is computationally intensive. In addition because of inherent limitations in clustering process that a cluster might not content a single theme or phrase that can cover all the records in the cluster. Further, prior art technique disclosing label using single most frequent phrase or keyword do not exemplify all the records in a given cluster. Thus prior art techniques fail to provide an automatic way to provide descriptive label which will reflect most of the content in the given cluster.

SUMMARY

This summary is provided to introduce aspects related to systems and methods for creating one or more labels for one or more cluster and the aspects are further described below in the detailed description. This summary is not intended to identify essential features of the claimed subject matter nor is it intended for use in determining or limiting the scope of the claimed subject matter.

In one implementation, a system for at least one label for at least one cluster in a computing environment is disclosed. The system comprises a processor and a memory coupled to the processor, wherein the processor is capable of executing a plurality of modules stored in the memory, and wherein the plurality of modules comprise: a receiving module configured to receive an input data; a candidate items selector configured to select a plurality of candidate items occurring repetitively in the input data using a n-gram selection technique for a predefined value of n to generate a sorted list of the plurality of candidate items with a frequency of occurrence of the plurality of candidate items based on the input data; a combination array generator configured to select a predefined number of the plurality of candidate items from the sorted list of the plurality of candidate items to populate a two-dimensional array having a plurality of elements, wherein each element of the plurality of elements of the two-dimensional array represents a pair of the plurality of candidate items; a coverage value analyzer configured to determine a coverage value for each pair of the plurality of candidate items present in the two-dimensional array to further populate a sorted two-dimensional array; a candidate pair selector configured to select a predefined number of pairs of the plurality of candidate items from the sorted two-dimensional array to further process and generate a list of the pairs of the plurality of candidate items; a unique word filter configured to accept the list of the pairs of the plurality of candidate items to determine a number of unique words in each of the pairs of the plurality of candidate items; and a cluster label selector configured to sort the list of the pairs of the plurality of candidate items using the coverage value and the number of unique words to create a sorted list of the pairs of the plurality of candidate items for selecting a cluster label from the sorted list of the pairs of the plurality of candidate items.

The present disclosure also discloses a method for creating at least one label for at least one cluster in a computing environment. One embodiment of such a method, among others, can be broadly summarized by the following steps: receiving an input data; selecting a plurality of candidate items occurring repetitively in the input data using a n-gram selection technique for a predefined value of n to generate a sorted list of the plurality of candidate items with a frequency of occurrence of the plurality of candidate items; selecting a predefined number of the plurality of candidate items from the sorted list of the plurality of candidate items to populate a two-dimensional array having a plurality of elements, wherein each element of the plurality of elements of the two-dimensional array represents a pair of the plurality of candidate items; determining a coverage value for each pair of the plurality of candidate items from the two-dimensional array to further populate a sorted two-dimensional array; selecting a predefined number of pairs of the plurality of candidate items from the sorted two-dimensional array to further process and generate a list of the pairs of the plurality of candidate items; accepting the list of the pairs of the plurality of candidate items to determine a number of unique words in each of the pairs of the plurality of candidate items; and sorting the list of the pairs of the plurality of candidate items using the coverage value and the number of unique words to create a sorted list of the pairs of the plurality of candidate items for selecting a cluster label form the sorted list of the pairs of the plurality of candidate items; wherein the receiving, the selecting the plurality of candidates, the selecting the predefined number of the plurality of candidate items, the determining the coverage value, the selecting the predefined number of pairs, the accepting the list, and the sorting the list are performed by a processor of a computerized device.

The present disclosure also discloses a computer program product having embodied thereon a computer program for creating o at least one label for at least one cluster. The computer program product comprises a program code for receiving an input data; a program code for selecting a plurality of candidate items occurring repetitively in the input data using a n-gram selection technique for a predefined value of n to generate a sorted list of the plurality of candidate items with a frequency of occurrence of the plurality of candidate items; a program code for selecting a foremost predefined number of the plurality of candidate items from the sorted list of the plurality of candidate items to populate a two-dimensional array having a plurality of elements, wherein each element of the plurality of elements of the two-dimensional array represents a pair of the plurality of candidate items; a program code for determining a coverage value for each pair of the plurality of candidate items from the two-dimensional array to further sort the two-dimensional array in a descending order of the coverage value for each pair of the plurality of candidate items to populate a sorted two-dimensional array; a program code for selecting a predefined number of pairs of the plurality of candidate items from the sorted two-dimensional array occurring foremost to further process and generate a list of the pairs of plurality of candidate items; a program code for accepting the list of the pairs of the plurality of candidate items to determine a number of unique words in each of the pairs of the plurality of candidate items; and a program code for sorting the list of the pairs of the plurality of candidate items using the coverage value and the number of unique words to create a sorted list of the pairs of the plurality of candidate items for selecting a cluster label form the sorted list of the pairs of the plurality of candidate items.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

System and method for creating labels for cluster are described. System generates one or more descriptive labels that cover important themes discussed in a given set of documents of similar nature and are called as cluster. The label generated by the system for a cluster of documents could be formed using a single word or a single phrase and/or combination of them. System and method may use n-gram technique to select the candidate items occurring repetitively in the input set of documents. Further the candidate items are selected based on the frequency of occurrence of the candidate items. A two-dimensional array is generated by using the selected candidate items. Each element of the two-dimensional array represents a pair of the n-gram. Coverage value for each pair of the n-gram in the two-dimensional array is used to select the candidate pairs from the two-dimensional array. Further unique words occurring in each candidate pairs are determined. Further, cluster labels are selected based on the coverage value and the number of unique words in each of the candidate pairs.

The system and method identifies predefined number of labels for example three, and user then selects one of the labels as appropriate descriptor of the set of documents. The system and method disclosed herein may also find application in labeling the collection of documents that are to be clustered to give cluster centers.

While aspects of described system and method for creating one or more labels for one or more cluster, may be implemented in any number of different computing systems, environments, and/or configurations, the embodiments are described in the context of the following exemplary system.

Figure 1:
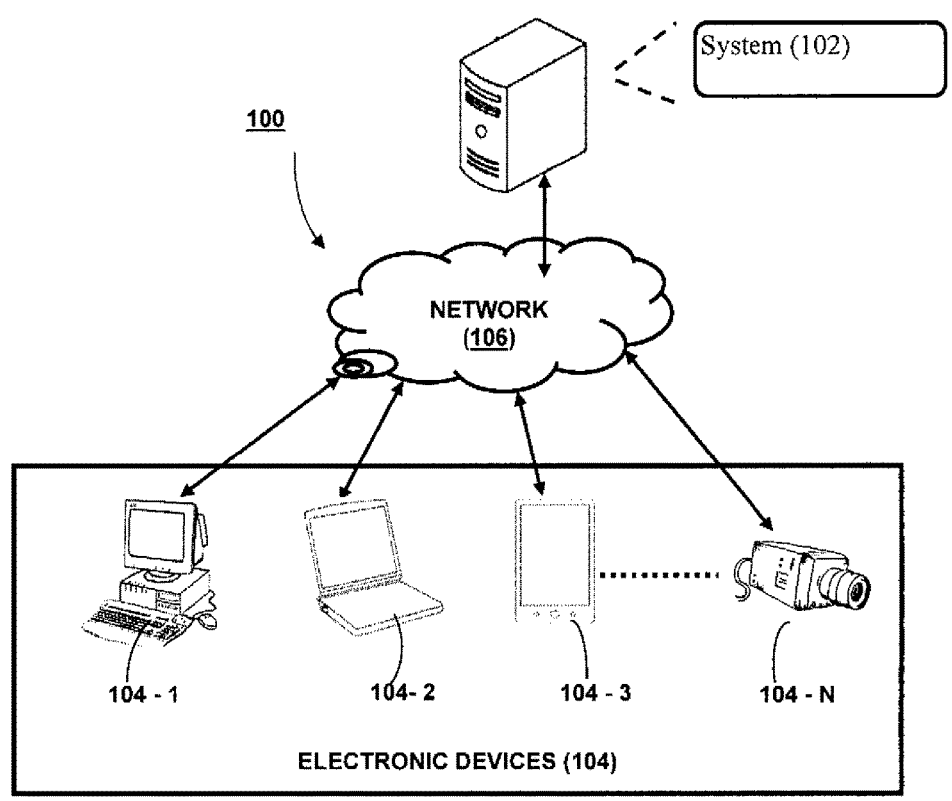
FIG. 1 illustrates a network implementation of a system for creating one or more labels for one or more clusters in a computing environment, in accordance with an embodiment of the present subject matter.

Referring now to FIG. 1, a network implementation 100 of system 102 for creating one or more labels for one or more cluster is illustrated, in accordance with an embodiment of the present subject matter.

Although the present subject matter is explained considering that the system 102 is implemented on a server, it may be understood that the system 102 may also be implemented in a variety of computing systems, such as a laptop computer, a desktop computer, a notebook, a workstation, a mainframe computer, a server, a network server, and the like. It will be understood that the system 102 may be accessed by multiple users through one or more user devices 104-1, 104-2 . . . 104-N, collectively referred to as user 104 hereinafter, or applications residing on the user devices 104. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
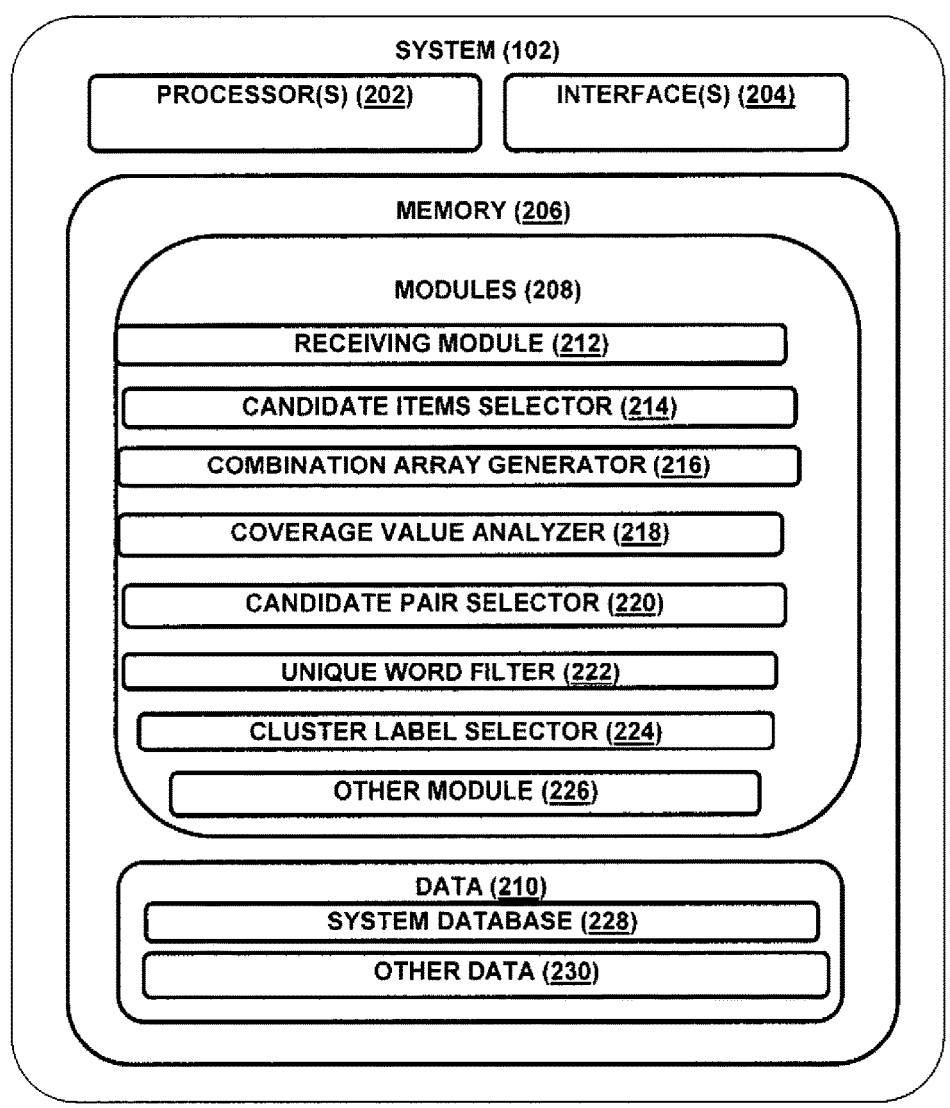
FIG. 2 illustrates the system for creating one or more labels for one or more cluster, in accordance with an embodiment of the present subject matter.

Referring now to FIG. 2, the system 102 is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with a user directly or through the client devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks, far example, LAN, cable, etc., and wireless networks, such as WLAN, cellular, or satellite. The I/O interface 204 may include one or more ports for connecting a number of devices to one another or to another server.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 include routines, programs, objects, components, data structures, etc., which perform particular tasks or implement particular abstract data types. In one implementation, the modules 208 may include a receiving module 212, a candidate items selector 214, a combination array generator 216, a coverage value analyzer 218, a candidate pair selector 220, a unique word filter 222, a cluster label selector 224 and other modules 226. The other modules 226 may include programs or coded instructions that supplement applications and functions of the system 102.

The data 210, amongst other things, serves as a repository for storing data processed, received, and generated by one or more of the modules 208. The data 210 may also include a system database 228, and other data 230. The other data 230 may include data generated as a result of the execution of one or more modules in the other module 226.

In one implementation, at first, a user may use the client device 104 to access the system 102 via the I/O interface 204. The user may register him using the I/O interface 204 in order to use the system 102. The working of the system 102 may be explained in detail in FIGS. 2 and 3 explained below. The system 102 may be used for creating one or more labels for one or more cluster.

In accordance with an embodiment of the present subject matter, referring to FIG. 2, a detailed working of the system 102 is explained. The system 102 comprises the receiving module 212 configured to receive an input data. The input data comprises a set of text documents, a set of text records associated with one or more cluster. The set of text documents may comprise survey responses, responses on the blogs, user forums or any other collection of text data required by the person skilled in the art etc.

In one embodiment, the collection of text document or text records may be called as cluster. By way of an example, text responses to a survey question are clustered into five clusters indicating major concerns respondents have. The responses are stored in an electronic format. Each cluster shows the records belonging to that group or have index of that document. Further, the objective is to create a label for each cluster.

Table 1 shows sample ingredients of the cluster content as an example, further comprises Environment Culture Cluster content captured as a survey response.

TABLE 1

| | |
|---|---|
| 1 | North Sydney is a well recognized business location |
| 2 | Client |
| 3 | Technology |
| 4 | Friendly environment |
| 5 | The work environment |
| 6 | Business area Near in the MRT |
| 7 | Comfortable environment |
| 8 | Encouraging environment, the opportunity to communicate with others on some problems we are studying, etc. |
| 9 | Working Environment |
| 10 | Friendly environment. |
| 11 | Friendly work environment, approachability of people. |
| 12 | Good environment, good team |
| 13 | Technology |
| 14 | Environment provided is bright and clean. |
| 15 | I am at a client side, hence most of the project Management and work environment policies are set by the client. |

The system 102 further comprises a candidate items selector 214 configured to select plurality of candidate items occurring repetitively in the input data. The selection of candidate items may be performed by using an n-gram selection technique for a predefined value of n. Further after selecting the candidate items, a frequency of occurrence of the candidate items in the input set of data is calculated and the list of candidate items is further sorted by using the value of the frequency of occurrence of the candidate items to generate a sorted list of candidate items. The candidate items further comprises of words, phrases or a combination thereof. In one embodiment, the predefined value of n using n-gram technique may range from 1 to 5. The list of candidate items is sorted in accordance with a descending order of the frequency of occurrence of the candidate items.

In accordance with an exemplary embodiment, the documents or the records in the first cluster are accessed to create candidate items list of most frequent word or phrases. System uses n-gram technique for selecting candidate items. The system can take any value of n as configured by the user and perform candidate items selection. In one embodiment, system uses value of n from 1 to 5. It is observed empirically that going beyond 5-gram provides only marginal improvement in labeling survey responses. Further, the frequency of occurrence of each n-gram within the records in a given cluster is calculated. Further, a list of candidate items (n-grams) along with frequency of occurrence of each n-gram is created. Further, the list of candidate items (n-gram) is sorted in descending order. In another embodiment, the list of candidate items (n-gram) may be sorted in ascending order of the frequency of occurrence.

According to an exemplary embodiment, Table 2 shows a sample of a sorted list of n-grams/the plurality of candidate items with frequency of occurrence of n-gram/the plurality of candidate items in the Environment-Culture cluster.

TABLE 2

| Candidate Item | Frequency Of Occurrence |
|---|---|
| Environment | 67 |
| Friendly | 9 |
| Clean | 8 |
| Learn | 6 |
| Client | 5 |
| friendly environment | 5 |

TABLE 2-continued

| Candidate Item | Frequency Of Occurrence |
| --- | --- |
| office environment | 2 |
| comfortable environment | 2 |
| environment etc | 2 |
| nice environment | 2 |
| easy access to | 1 |
| neat and clean | 2 |
| comfortable work environment | 2 |
| office building and | 1 |
| office environment etc | 1 |
| own decisions friendly and | 1 |
| project environment is totally | 1 |
| opportunity learn my client | 1 |
| other services relatively clean | 1 |
| organized office environment etc | 1 |
| provided is bright and clean | 1 |
| project management and work environment | 1 |
| project environment is totally different | 1 |
| quality food in canteen good | 1 |
| public transportation easy access to | 1 |

Coverage value=$P(A)+P(B)-P(A \cap B)$. The coverage value in the cell indicates the maximum coverage with minimum overlap between the two n-gram pairs. ($A \cap B$) provides the pair of n-gram A intersected with the pair of n-gram B. $P(A \cap B)$ means coverage value for a set that contains the pair of n-gram A and the pair of n-gram B having in common. Based on the coverage value for each n-gram pair, the two-dimensional array (matrix) are sorted in descending order (largest value first).

According to an exemplary embodiment, Table 3 shows a sample of the two-dimensional array with the n-gram pairs and the coverage value for the n-gram pair. By way of an example, Table 3 shows the unigram pairs with respective coverage value for the Environment-Culture cluster.

|  | environment | friendly | clean | learn | client |
| --- | --- | --- | --- | --- | --- |
| environment | 0.761363636 | 0.761364 | 0.829545 | 0.818181818 | 0.784090909 |
| friendly | 0.761363636 | 0.102273 | 0.193182 | 0.170454545 | 0.159090909 |
| clean | 0.829545455 | 0.193182 | 0.090909 | 0.159090909 | 0.147727273 |
| learn | 0.818181818 | 0.170455 | 0.159091 | 0.068181818 | 0.113636364 |
| client | 0.784090909 | 0.159091 | 0.147727 | 0.113636364 | 0.056818182 |

The system 102 further comprises the combination array generator 216 configured to select foremost predefined number of the candidate items from the sorted list of candidate items and to populate a two-dimensional array. Each element of the two-dimensional array represents a pair of the n-gram. In accordance with an exemplary embodiment, the candidate items list created by candidate items selector is accessed by the combination array generator and the combination array generator selects top 5 n-grams for each n as candidate items for further processing. The list of candidate items is sorted in descending order, hence a predefined number of foremost candidate items are selected. In another embodiment, the list of candidate items is sorted in ascending order of the frequency of occurrence, hence predefined number of bottommost candidate items may be selected. The predefined number of candidate items/n-gram selected may be three, four, five or more. By way of an example, top five n-grams for each n as candidates are selected for further processing after completion of candidate items (n-grams) selection, system has 25 n-grams along with frequencies of occurrence. The combination array generator generates a two-dimensional array can be matrix of 25×25 cells wherein each cell represents a coverage value for a pair of n-gram.

The system 102 further comprises the coverage value analyzer 218 configured to determine a coverage value for each pair of the n-gram present in the two-dimensional array. The coverage value analyzer further configured to populate a sorted two-dimensional array. The coverage value for each pair of the n-gram is determined to further ensure a maximum coverage with a minimum overlap. The two-dimensional array is sorted in accordance with a descending order of the coverage value for each pair of the n-gram. In accordance with an exemplary embodiment, the coverage value analyzer calculates coverage value for each cell, that is, for each pair of n-gram in the matrix. The coverage value for a pair of n-gram A, and a pair of n-gram B is given as According to an exemplary embodiment, Table 4 shows a sample of the sorted two-dimensional array including n-gram pairs with respective coverage value in the cluster. By way of an example, Table 4 shows the sample of the sorted two-dimensional array content having n-gram pairs with respective coverage value for the Environment-Culture cluster. The content of two-dimensional array is sorted based on the coverage value of the n-gram pair.

TABLE 4

| Gram1 | Gram2 | Label | P(AUB) |
| --- | --- | --- | --- |
| 1 | 1 | environment, clean | 0.829545 |
| 1 | 1 | environment, learn | 0.818182 |
| 1 | 1 | environment, client | 0.784091 |
| 1 | 3 | environment, neat and clean | 0.784091 |
| 1 | 4 | environment, opportunity learn my client | 0.772727 |
| 1 | 2 | environment, comfortable environment | 0.761364 |
| 1 | 2 | environment, office environment | 0.761364 |
| 1 | 4 | environment, own decisions friendly and | 0.761364 |
| 1 | 4 | environment, other services relatively clean | 0.761364 |
| 1 | 3 | environment, office environment etc | 0.761364 |
| 1 | 2 | environment, friendly environment | 0.761364 |
| 1 | 1 | environment, friendly | 0.761364 |
| 1 | 3 | environment, office building and | 0.761364 |
| 1 | 2 | environment, nice environment | 0.761364 |
| 1 | 3 | environment, easy access to | 0.761364 |
| 1 | 3 | environment, comfortable work environment | 0.761364 |

The system 102 further comprises the candidate pair selector 220 is configured to select a predefined number of pairs of the n-gram from the sorted two-dimensional array occurring foremost to further process and generate a list of the candidate pairs. The candidate pair selector further selects at least top 2 n-gram pairs from the sorted two-dimensional array. In accordance with an exemplary embodiment, the sorted two-dimensional array is filled with the coverage value for each n-gram pairs, the candidate pair selector selects top two pairs from the sorted two-dimensional array. This step is executed to further reduce the probable pairs for the labels. System can select any number of top values. By way of an example the two-dimensional array is a matrix.

The reported disclosure in present embodiment, selects top 2 values from n-gram pairs (1,5), (1,4), (1,3), (2,5), (2,4), (2,3). With execution of this step, the candidate pair selector creates 12 pairs of n-gram as candidate pairs for labels. System stores this list of n-gram pairs and coverage values of n-gram pairs in electronic format for further processing. According to exemplary embodiment, the pairs including only unigram, only bigram or combination of unigram and bigram are not selected as candidate pair, as they are not found to be suitable labels. For example (1,1), (1,2), (2,1), (2,2).

The system 102 comprises the unique word filter 222 configured to accept the list of the candidate pairs to determine a number of unique words in each of the candidate pairs. According to the exemplary embodiment, the unique word filter accepts the list created by the candidate pair selector and calculates number of unique words in each n-gram pair. Unique word herein is referred as unique in the collection of documents in a given cluster—a word is a unique word if the word appears in just one or two documents in a given cluster. The unique word filter then updates the list of candidate pair with number of unique words in each n-gram pair.

The system 102 further comprises the cluster label selector 224 configured to sort the list of the candidate pairs using the coverage value of the n-gram pair and the number of unique words in the n-gram pair to create a sorted list of the candidate pairs for selecting a cluster label from the sorted list of the candidate pairs. The cluster label selector sorts the list of the candidate pairs by using the coverage value in a descending order and the number of unique words in ascending order or vice a versa to create a sorted list of the candidate pair. The cluster label selector selects at least 3 candidate pairs from the sorted list of candidate pairs to further select the cluster labels. According to an exemplary embodiment, the cluster label selector sorts the candidate pair list first by using coverage value in descending order and then number of unique words in ascending order and then stores in electronic form. In another embodiment, the cluster label selector may sort the candidate pair list first by using the number of unique words in ascending order and then using the coverage value in descending order and then stores in electronic form. The cluster label selector accesses the sorted list and selects top candidate pair as candidate labels for the given cluster. Further, the system displays for example top 3 values from the candidate pair list on the user interface as the candidate labels and user may select one of them as a cluster label. In yet another embodiment, all the n-gram pairs from the candidate pair list with its coverage value are shown to the user for selection of cluster label.

In accordance with one exemplary embodiment, Table 5 shows the sorted list of candidate pairs created by the cluster label selector 224. Column first and second show n-gram strength. For example, first label in the tables created by a pair of one word "environment" and a trigram "neat and clean" and corresponding coverage and the unique word in the n-gram pairs is shown in column four and five. As shown in the table 5, the list of candidate pair is sorted first by using the coverage value in a descending order and the number of unique words in an ascending order. Further, user can choose the most appropriate label for the cluster. As shown below, the labels or the candidate pairs occurring foremost in the list below are the more appropriate labels.

TABLE 5

| Gram1 | Gram2 | Label/Candidate Pair | Coverage Value P(AUB) | Unique words |
|---|---|---|---|---|
| 1 | 3 | environment, neat and clean | 0.784091 | 0 |
| 1 | 4 | environment, opportunity learn my client | 0.772727 | 0 |
| 1 | 3 | environment, office environment etc | 0.761364 | 0 |
| 2 | 3 | friendly environment, neat and clean | 0.079545 | 0 |
| 2 | 3 | friendly environment, comfortable work environment | 0.079545 | 0 |
| 2 | 4 | friendly environment, organized office environment etc | 0.068182 | 0 |
| 2 | 4 | friendly environment, opportunity to learn my client | 0.068182 | 0 |
| 1 | 4 | environment, own decisions friendly and | 0.761364 | 2 |
| 1 | 5 | environment, public transportation easy access to | 0.761364 | 2 |
| 1 | 5 | environment, provided is bright and clean | 0.761364 | 2 |
| 2 | 5 | friendly environment, quality food in canteen good | 0.068182 | 2 |
| 2 | 5 | friendly environment, provided is bright and clean | 0.068182 | 2 |

In yet another embodiment, as shown in table 6, the cluster label selector 224, selects top 3 labels as label for given cluster. Further, the system 102, may display the top 3 labels to the user and user may select one of them as a cluster label. For example, the labels below are selected as final labels:

TABLE 6 environment, neat and clean
environment, opportunity learn my client
environment, office environment etc Further, it is observed that referring to Table 4, although the unigram pairs occurring foremost are having highest coverage value, they are comparatively less readable, so they are not the suitable labels for the cluster. Rather, the n-gram pairs may be bi-gram, tri-gram and onwards selected as a top pairs from the two-dimensional array are found to be suitable labels.

In accordance with another embodiment, the cluster label selector 224 is further configured to find cluster centers. For a given set of documents to be clustered as input data the foremost candidate labels from the candidate pair list may be selected as cluster centers for further processing of clustering. By way of an example, top 5 candidate labels or the candidate pairs from the sorted list of candidate pairs may be selected as cluster centers for further processing of clustering.

Figure 3:
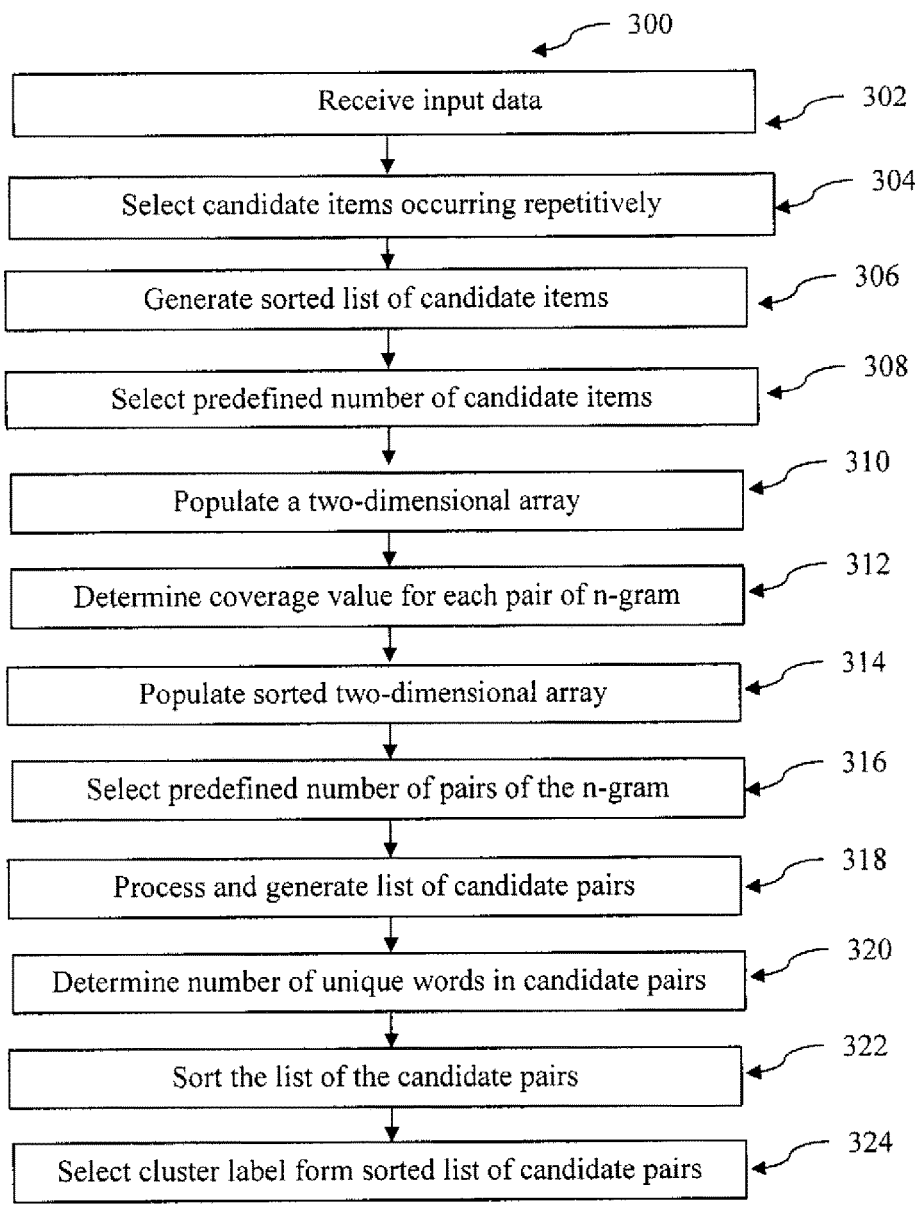
FIG. 3 illustrates a method for creating one or more labels for one or more cluster, in accordance with an embodiment of the present subject matter.

Referring to FIG. 3, a method (300) for creating one or more labels for one or more cluster is shown in accordance with an embodiment of the present subject matter. The method (300) may be described in the general context of computer executable instructions. Generally, computer executable instructions can include routines, programs, objects, components, data structures, procedures, modules, functions, etc., that perform particular functions or implement particular abstract data types. The method 300 may also be practiced in a distributed computing environment where functions are performed by remote processing devices that are linked through a communications network. In a distributed computing environment, computer executable instructions may be located in both local and remote computer storage media, including memory storage devices.

The order in which the method 300 described are not intended to be construed as a limitation, and any number of the described method blocks can be combined in any order to implement the method 300 or alternate methods. Additionally, individual blocks may be deleted from the method 300 without departing from the spirit and scope of the subject matter described herein. Furthermore, the method can be implemented in any suitable hardware, software, firmware, or combination thereof. However, for ease of explanation, in the embodiments described below, the method 300 may be considered to be implemented in the above described system 102.

Referring to FIG. 3, a method (300) for creating one or more labels for one or more cluster is described. In step 302, an input data is received. In one implementation, the input data is received by the receiving module 212. The input data further comprises a set of text documents, a set of text records associated with the cluster. In step 304, a plurality of candidate items occurring repetitively in the input data is selected using n-gram technique for a predefined value of n. The candidate items further comprises of words, phrases or a combination thereof. The predefined value of n using n-gram technique ranges from 1 to 5. Further frequency of occurrence of each candidate item in the input data is calculated. In one implementation, the plurality of candidate items occurring repetitively in the input data is selected using n-gram technique for a predefined value of n by the candidate items selector 214. In one implementation, the frequency of occurrence of each candidate item in the input data is calculated by the candidate items selector 214. In step 306, a sorted list of candidate items is generated with a frequency of occurrence of the candidate items. The list of candidate items is sorted in accordance with a descending order of the frequency of occurrence of said candidate items. In one implementation, a sorted list of candidate items with a frequency of occurrence of the candidate items is generated by the candidate items selector 214.

Referring to FIG. 3, in step 308, a foremost predefined number of the candidate items from the sorted list of candidate items are selected. In one implementation, the foremost predefined number of the candidate items from the sorted list of candidate items is selected by the combination array generator 216. In step 310, a two-dimensional array is populated wherein each element of the two-dimensional array represents a pair of the n-gram. In one implementation, the two-dimensional array is populated by the combination array generator 216 wherein each element of the two-dimensional array represents a pair of the n-gram. In step 312, a coverage value for each pair of the n-gram from the two-dimensional array is determined. The coverage value for each pair of the n-gram is determined to further ensure a maximum coverage with a minimum overlap. In one implementation, the coverage value for each pair of the n-gram from the two-dimensional array is determined by the coverage value analyzer 218. In step 314, a sorted two-dimensional array is populated. The two-dimensional array is sorted in accordance with a descending order of the coverage value for each pair of the n-gram. In one implementation, the sorted two-dimensional array is populated by the coverage value analyzer 218.

Still referring to FIG. 3, in step 316, a predefined number of pairs of the n-gram are selected from the sorted two-dimensional array occurring foremost. In one implementation, the predefined number of pairs of the n-gram occurring foremost from the sorted two-dimensional array is selected by the candidate pair selector 220. The candidate pair selector further selects at least top 2 n-gram pairs. In step 318, the selected n-gram pairs are further processed and a list of a candidate pairs is generated. In one implementation, the selected n-gram pairs are further processed and the list of a candidate pairs is generated by the candidate pair selector 220.

Referring to FIG. 3, in step 320, the list of the candidate pairs is accepted and further a number of unique words in each of the candidate pairs is determined. In one implementation, the list of the candidate pairs is accepted by the unique word filter 222 and further a number of unique words in each of the candidate pairs is determined by the unique word filter 222. In step 322, the list of the candidate pairs is sorted using the coverage value and the number of unique words to create a sorted list of the candidate pair. Sorting of the list of the candidate pairs is performed by using the coverage value in a descending order and the number of unique words in an ascending order or vice a versa to create a sorted list of the candidate pair. In one implementation, the list of the candidate pairs is sorted using the coverage value of the candidate pair and the number of unique words in the candidate pair by the cluster label selector 224. In step 324, a cluster label is selected form the sorted list of the candidate pairs. At least top 3 candidate pairs are selected from the sorted list of candidate pairs to further select the cluster labels. In one implementation, the cluster label form the sorted list of the candidate pairs is selected by the cluster label selector 224.

Still referring to FIG. 3, in method 300, the receiving, the selecting plurality of candidates, the selecting foremost predefined number of candidate items, the determining, the selecting a predefined number of pairs, the accepting and the sorting steps explained above are performed by the processor 202.

Exemplary embodiments discussed below may provide certain advantages. Though not required to practice aspects of the disclosure, the advantages may include the advantages provided by the following features.

System and method of the present disclosure uses two statistical parameters to assure the good coverage without any overlap between the two individual n-grams in a given n-gram pair.

System and method of the present disclosure overcomes the readability problem by choosing n-gram pairs rather than single word or phrases or a single n-gram and use of n-gram pairs together provide good coverage than a single word or a phrase or a single n-gram.

System and method of the present disclosure uses unique word filtration mechanism which assures that low frequency words are not a part of the label.

System and method of the present disclosure does not make use of any natural language processing techniques and hence simple to maintain, robust, computationally efficient and less time consuming.

System and method of the present disclosure can create labels for documents in any language.

System and method of the present disclosure is generic and can create labels for any collection of any logical units of words.

We claim:

1. A system for automatically creating at least one label for at least one cluster of text documents in a computing environment, the system comprising:

a processor; and a memory coupled to the processor, wherein the processor is capable of executing a plurality of modules stored in the memory, and wherein the plurality of modules comprise:

a receiving module configured to receive an input data comprising a set of text documents;

a candidate items selector configured to:

select a plurality of candidate items occurring repetitively in the input data, wherein the selection of the plurality of candidate items is not based on verifying meaning of the candidate items or co-occurrence of the candidate items, wherein the plurality of candidate items comprises one or more words, a combination of words, and one or more phrases, wherein the candidate items are selected using n-gram selection technique, and a value of 'n' ranges from 1 to 5; and generate a sorted list of the plurality of candidate items based on a frequency of occurrence of the plurality of candidate items in the input data;

a combination array generator configured to select a 'i' number of top scorer candidate items for the each n-gram from the sorted list of the plurality of candidate items to populate a two-dimensional array of 'i*n×i*n' size by creating pairs between each n-gram candidate items for 'n' varying from 1 to n, and wherein the two dimensional array is a matrix of the 'i*n×i*n' size, wherein the pairs of candidate items are generated by making one to one pair combinations of each of the 'i' number of candidate items of each n-gram in a {(unigram, unigram), (unigram, bigram), (unigram, trigram) up to (n-gram, n-gram)} pattern;

a coverage value analyzer configured to determine a coverage value for each pair of the candidate items associated with each cell of the two-dimensional array to further populate a sorted two-dimensional array based on the coverage value, wherein each cell of the two-dimensional array contains the coverage value of each pair of the candidate items in the input data, wherein the coverage value for each pair of the candidate items of the matrix is computed by adding the coverage value for each candidate item of the pair of the candidate items and subtracting the coverage value for the pair of candidate items having in common from the addition;

a candidate pair selector configured to select a predefined number of pairs of the candidate items from the sorted two-dimensional array to further process and generate a list of the pairs of the candidate items, wherein the two-dimensional array is sorted in accordance with a descending order of the coverage value for each pair of the candidate items and the candidate pair selector selects pairs of the candidate items occurring foremost, and wherein the candidate pair selector is further configured to select at least top two pairs of the candidate items from the sorted two-dimensional array;

a unique word filter configured to accept the list of the pairs of the candidate items to determine a number of unique words in each of the pairs of the candidate items, wherein a unique word of the determined number of unique words further comprises a word appearing in no more than two documents in a single cluster of the at least one cluster; and a cluster label selector configured to sort the list of the pairs of the candidate items using the coverage value and the number of unique words to create a sorted list of the pairs of the candidate items for selecting a cluster label from the sorted list of the pairs of the candidate items.

2. The system of claim 1, wherein the input data comprises at least one of: a set of text documents and a set of text records associated with the at least one cluster.

3. The system of claim 1, wherein the list of the plurality of candidate items is sorted in accordance with a descending order of the frequency of occurrence of the plurality of candidate items, wherein a foremost predefined number of the plurality of candidate items is selected from the sorted list of the plurality of candidate items.

4. The system of claim 1, wherein the coverage value for each pair of the candidate items is determined to ensure a maximum coverage with a minimum overlap and the two-dimensional array is sorted in accordance with a descending order of the coverage value for each pair of the candidate items.

5. The system of claim 1, wherein the cluster label selector sorts the list of the pairs of the candidate items by using at least one of: the coverage value in a descending order and the number of unique words in an ascending order, and the coverage value in the ascending order and the number of unique words in the descending order, to create the sorted list of the pairs of the candidate items, and wherein the cluster label selector selects at least three pairs of the candidate items from the sorted list of pairs of the candidate items to select the cluster labels.

6. A method for automatically creating at least one label for at least one cluster of text documents in a computing environment, the method comprising:

receiving an input data comprising a set of text documents;

selecting a plurality of candidate items occurring repetitively in the input data wherein the selection of the plurality of candidate items is not based on verifying meaning of the candidate items or co-occurrence of the candidate items, wherein the plurality of candidate items comprises one or more words, a combination of words, and one or more phrases, wherein the candidate items are selected using n-gram selection technique, and a value of 'n' ranges from 1 to 5;

generating a sorted list of the plurality of candidate items based on a frequency of occurrence of the plurality of candidate items in the input data;

selecting a 'i' number of top scorer candidate items for the each n-gram from the sorted list of the plurality of candidate items to populate a two-dimensional array of 'i*n×i*n' size by creating pairs between each n-gram candidate items for 'n' varying from 1 to n, and wherein the two dimensional array is a matrix of the 'i*n×i*n' size, wherein the pairs of the candidate items are generated by making one to one pair combinations of each of the 'i' number of candidate items of each n-gram in a {(unigram, unigram), (unigram, bigram), (unigram, trigram) up to (n-gram, n-gram)} pattern;

determining a coverage value for each pair of the candidate items associated with each cell of the two-dimensional array to further populate a sorted two-dimensional array based on the coverage value, wherein each cell of the two-dimensional array contains the coverage value of each pair of the candidate items in the input data, wherein the coverage value for each pair of the candidate items of the matrix is computed by adding the coverage value for each candidate item of the pair of the candidate items and subtracting the coverage value for the pair of candidate items having in common from the addition;

selecting a predefined number of pairs of the candidate items from the sorted two-dimensional array to further process and generate a list of the pairs of the candidate items, wherein the two-dimensional array is sorted in accordance with a descending order of the coverage value for each pair of the candidate items and the candidate pair selector selects pairs of the candidate items occurring foremost, wherein at least top two pairs of the candidate items are selected from the sorted two-dimensional array;

accepting the list of the pairs of the candidate items to determine a number of unique words in each of the pairs of the candidate items; and sorting the list of the pairs of the candidate items using the coverage value and the number of unique words to create a sorted list of the pairs of the candidate items for selecting a cluster label form the sorted list of the pairs of the candidate items, wherein a unique word of the determined number of unique words further comprises a word appearing in no more than two documents in a single cluster of the at least one cluster;

wherein the receiving, the selecting the plurality of candidates, the selecting the predefined number of the plurality of candidate items, the determining the coverage value, the selecting the predefined number of pairs, the accepting the list, and the sorting the list are performed by a processor of a computerized device.

7. The method of claim 6, wherein the input data further comprises at least one of: a set of text documents and a set of text records associated with the at least one cluster.

8. The method of claim 6, wherein the list of the plurality of candidate items is sorted in accordance with a descending order of the frequency of occurrence of the plurality of candidate items, wherein a foremost predefined number of the plurality of candidate items are selected from the sorted list of the plurality of candidate items.

9. The method of claim 6, wherein sorting the list of the pairs of the candidate items is performed by using at least one of: the coverage value in a descending order and the number of unique words in an ascending order, and the coverage value in the ascending order and the number of unique words in the descending order, to create the sorted list of the pairs of the candidate items, wherein at least three pairs of the candidate items are selected from the sorted list of pairs of the candidate items to select the cluster labels.

10. The method of claim 6, wherein the step of determining the coverage value for each pair of the candidate items further comprises determining the coverage value for each pair of the candidate items to ensure a maximum coverage with a minimum overlap.

11. A non-transitory computer readable medium having embodied thereon a computer program for automatically creating at least one label for at least one cluster of text documents, the non-transitory computer readable medium comprising:

a program code for receiving an input data comprising a set of text documents;

a program code for selecting a plurality of candidate items occurring repetitively in the input data, wherein the selection of the plurality of candidate items is not based on verifying meaning of the candidate items or co-occurrence of the candidate items, wherein the plurality of candidate items comprises one or more words, a combination of words, and one or more phrases, wherein the candidate items are selected using n-gram selection technique, and a value of 'n' ranges from 1 to 5;

a program code for generating a sorted list of the plurality of candidate items based on a frequency of occurrence of the plurality of candidate items in the input data;

a program code for selecting a 'i' number of top scorer candidate items for the each n-gram from the sorted list of the plurality of candidate items to populate a two-dimensional array of 'i*n×i*n' size by creating pairs between each n-gram candidate items for 'n' varying from 1 to n, and wherein the two dimensional array is a matrix of the i*n×i*n' size, wherein the pairs of the candidate items are generated by making one to one pair combinations of each of the 'i' number of candidate items of each n-gram in a {(unigram, unigram), (unigram, bigram), (unigram, trigram) up to (n-gram, n-gram)} pattern;

a program code for determining a coverage value for each pair of the candidate items associated with each cell of from the two-dimensional array to further sort the two-dimensional array based on the coverage value for each pair of the candidate items to populate a sorted two-dimensional array, wherein each cell of the two-dimensional array contains the coverage value of each pair of the candidate items in the input data, wherein the coverage value for each pair of the candidate items of the matrix is computed by adding the coverage value for each candidate item of the pair of the candidate items and subtracting the coverage value for the pair of candidate items having in common from the addition;

a program code for selecting a predefined number of pairs of the candidate items from the sorted two-dimensional array occurring foremost to further process and generate a list of the pairs of the candidate items, wherein the two-dimensional array is sorted in accordance with a descending order of the coverage value for each pair of the candidate items and the candidate pair selector selects pairs of the candidate items occurring foremost, wherein at least top two pairs of the candidate items are selected from the sorted two-dimensional array;

a program code for accepting the list of the pairs of the candidate items to determine a number of unique words in each of the pairs of the candidate items, wherein a unique word of the determined number of unique words further comprises a word appearing in no more than two documents in a single cluster of the at least one cluster; and a program code for sorting the list of the pairs of the candidate items using the coverage value and the number of unique words to create a sorted list of the pairs of the candidate items for selecting a cluster label form the sorted list of the pairs of the candidate items.

12. The non-transitory computer readable medium of claim 11, wherein the input data comprises at least one of: a set of text documents and a set of text records associated with the at least one cluster.

13. The non-transitory computer readable medium of claim 11, wherein the list of the plurality of candidate items is sorted in accordance with a descending order of the frequency of occurrence of the plurality of candidate items, wherein the foremost predefined number of the plurality of candidate items is selected from the sorted list of the plurality of candidate items.

* * * * *